(12) United States Patent
Megas

(10) Patent No.: US 6,196,207 B1
(45) Date of Patent: Mar. 6, 2001

(54) ARRANGEMENT FOR VENTILATION OF CRANKCASE GASES IN AN INTERNAL-COMBUSTION ENGINE

(75) Inventor: Lucas Megas, Göteborg (SE)

(73) Assignee: Volvo Lastvagnar AB (SE)

(*) Notice: Subject to any disclaimer, the term of this patent is extended or adjusted under 35 U.S.C. 154(b) by 0 days.

(21) Appl. No.: 09/549,632

(22) Filed: Apr. 14, 2000

(30) Foreign Application Priority Data

Apr. 17, 1999 (SE) .................................................... 9901356

(51) Int. Cl.⁷ ...................................................... F02M 25/06

(52) U.S. Cl. .......................................................... 123/572

(58) Field of Search ..................................... 123/572, 573, 123/574, 41.86

(56) References Cited

U.S. PATENT DOCUMENTS

| 3,846,980 | * | 11/1974 | Depalma ........................ 123/572 |
| 5,564,401 | | 10/1996 | Dickson ........................ 123/573 |
| 6,037,670 | * | 4/2000 | Stella et al. ................... 123/572 |

FOREIGN PATENT DOCUMENTS

| 0 810 352 A1 | 3/1997 | (EP) . |
| 1 481 037 | 7/1977 | (GB) . |

* cited by examiner

Primary Examiner—Marguerite McMahon
(74) Attorney, Agent, or Firm—Lerner, David, Littenberg, Krumholz & Mentlik, LLP

(57) ABSTRACT

Apparatus is disclosed for ventilation of crankcase gases in an internal combustion engine including a conduit for connecting the crankcase to an air inlet of the engine, and an oxidation catalyst in the conduit for cleaning the crankcase gases, the conduit being connected to the air inlet at a point upstream of the compressor of the turbo unit for the internal combustion engine.

6 Claims, 1 Drawing Sheet

ARRANGEMENT FOR VENTILATION OF CRANKCASE GASES IN AN INTERNAL-COMBUSTION ENGINE

FIELD OF THE INVENTION

The present invention relates to apparatus for ventilation of crankcase gases in an internal-combustion engine. The present invention is particularly intended for use in systems for ventilation of crankcase gases in heavy trucks.

BACKGROUND OF THE INVENTION

In connection with vehicles which include an internal-combustion engine, different methods are presently used for treatment of the gas that is being fed from the engine of the vehicle in connection with the combustion which takes place in the engine. Such exhaust treatment then takes place for different reasons, e.g. demands regarding the cleaning of hazardous pollutants in the exhaust gases, as well as desires for greater fuel economy and a longer engine lifetime.

In this context, it is known to use apparatus for ventilating crankcase gases from the crankcase of the engine. The crankcase gases are generated in the various combustion chambers of the engine during operation thereof, and generally contain a relatively high concentration of combustible hydrocarbons. The crankcase gases are directed from the combustion chamber, between the respective cylinder liner and piston ring at the respective engine cylinder, and then to the engine's crankcase. After that, the crankcase gases are led from the crankcase and then on to the engine's oil pan.

According to a known technique, the crankcase gases are fed from the engine's oil pan and back to a suitable point in the engine's inlet side. From there, the gas can once again be sucked into the engine's air inlet for combustion in the engine. The ventilation and return of the crankcase gases back to the inlet side of the engine can reduce the discharge of hazardous pollutants from the engine.

One problem which occurs in known systems of the above type is based upon the fact that the crankcase gases that reach the oil pan flows towards the lubricating oil present in the oil pan. This results in part of the lubricating oil being transformed into an aerosol. If this aerosol should be allowed to be recirculated to the engine's inlet, coatings can be formed on different parts on the inlet side of the engine, e.g. in the combustion chamber of the engine and on the valves.

One further problem is that the aforementioned aerosol contains substances which one would want to separate from the crankcase gases, so that they will not be recirculated to the engine inlet.

In British Patent No. 1481037, apparatus is described for ventilation of crankcase gases in an internal-combustion engine. According to this patent, the crankcase gases, which contain combustible gaseous components, are fed to the engine inlet through an oxidation catalyst. In this oxidation catalyst the combustible gaseous components are oxidized, whereby resulting carbon dioxide and water are recirculated towards the engine inlet. In order to make the oxidation catalyst rapidly reach its correct operating temperature, it is also arranged in mechanical contact with the exhaust manifold of the engine.

Diesel engines for trucks are often designed for turbo charging, whereby an increased amount of air can be compressed and fed into the engine in a well-known manner. Normally, such systems also include an intercooler, whereby the air that is being fed through the compressor can be cooled.

In the engine arrangements that comprise turbo charging and an intercooler, a problem occurs if ventilated crankcase gases are fed to a compressor in the turbo unit, to be compressed and then fed to the intercooler. In this type of apparatus, a high degree of overcharging results in the temperature in the compressor being very high, up to about 170° C. This causes the oil residues in the crankcase gas that are being fed to the compressor to carbonise, which creates a coating in the compressor. This makes the blades in the compressor thicker, which leads to a reduced efficiency of the compressor. To obtain the performance of the engine corresponding to a system without recirculated crankcase gases there would then be a demand for a more efficient intercooler.

A further disadvantage in this arrangement relates to the fact that an oil film is condensed and will form a coating in the bottom of the intercooler. This leads to reduced efficiency of the intercooler. Furthermore, there is a risk that the oil film will be sucked into the engine.

An object of the present invention is to provide an improved apparatus for ventilation of crankcase gases in an internal-combustion engine, and particularly for an internal-combustion engine comprising a turbo unit and an intercooler.

SUMMARY OF THE INVENTION

In accordance with the present invention, this and other objects have now been realized by the invention of apparatus for the ventilation of crankcase gases in an internal combustion engine including a crankcase, an air inlet, a turbo unit including a compressor, and an exhaust manifold and exhaust conduit, the apparatus comprising a conduit for connecting the crankcase to the air inlet of the engine, and an oxidation catalyst disposed in connection with the conduit for cleaning the crankcase gases, the conduit being connected to the air inlet at a point upstream of the compressor of the turbo unit. Preferably, the apparatus includes heating means for heating the oxidation catalyst. In a preferred embodiment, the heating means comprises means for mounting the oxidation catalyst proximate to the exhaust manifold of the engine. In another embodiment, the heating means comprises means for mounting the oxidation catalyst proximate to the exhaust conduit of the engine.

In accordance with another embodiment of the apparatus of the present invention, the heating means comprises an electrical heating device.

In accordance with another embodiment of the apparatus of the present invention, the engine comprises a diesel engine.

The present invention constitutes apparatus for ventilation of crankcase gases in an internal-combustion engine of a vehicle and comprises a connection for recirculation of crankcase gases from the engine's crankcase to the engine's air inlet, an oxidation catalyst for cleaning of the crankcase gases, arranged along that connection, whereby the engine also is provided with a turbo unit and an intercooler. The present invention is characterised in that the connection comprises a conduit that connects between the oxidation catalyst and an incoming conduit to the compressor of the turbo unit.

BRIEF DESCRIPTION OF DRAWINGS

The present invention will be described below in the detailed description, which refers to FIG. 1, which shows a side, elevational, schematic representation of the present invention, in principle and in simplified form.

DETAILED DESCRIPTION

Figure 1:
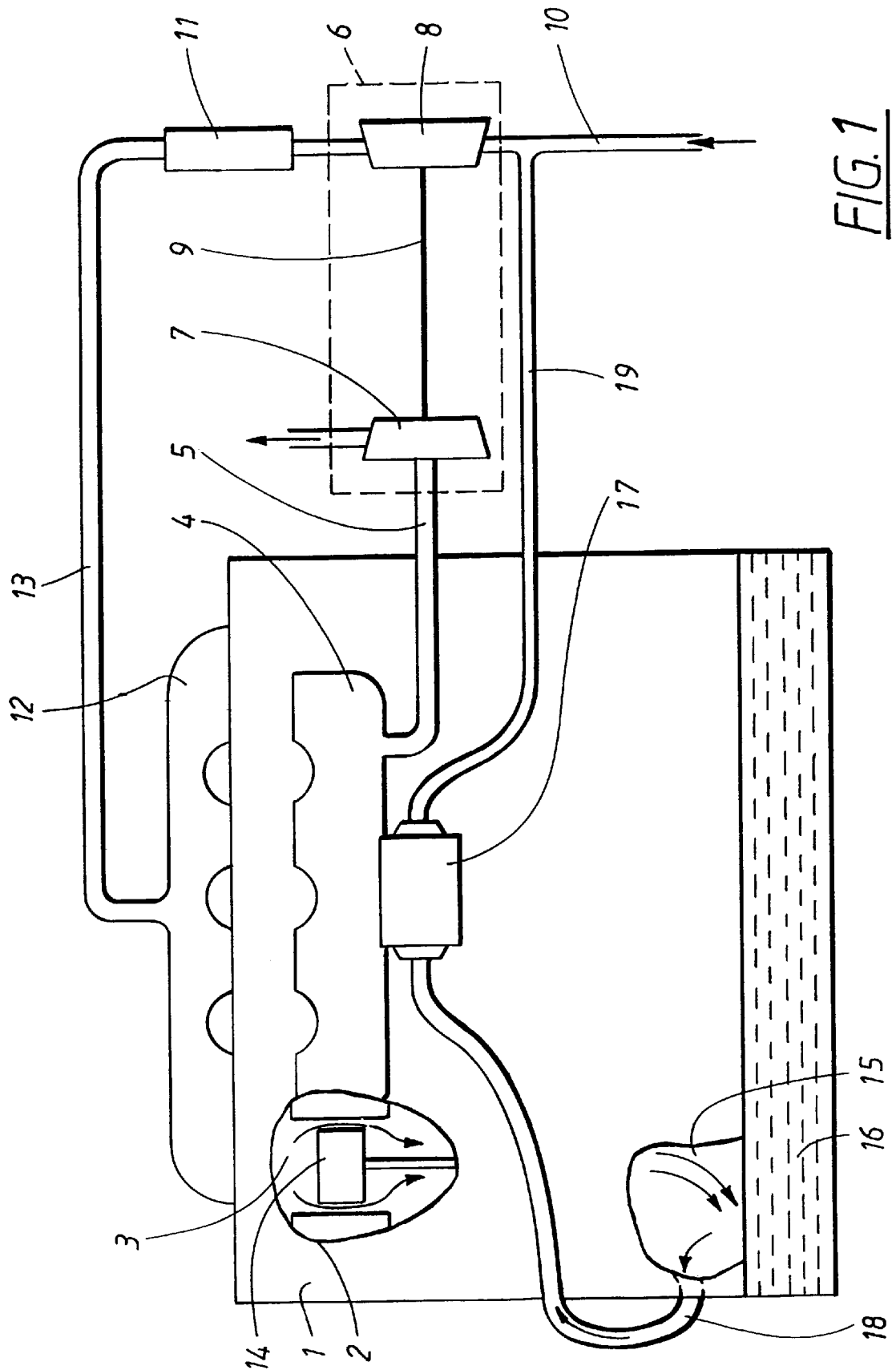

Referring to the FIGURE, FIG. 1 shows the present invention in principle. According to a preferred embodiment, this apparatus is used in connection with an internal-combustion engine 1, which preferably but not exclusively can be a diesel engine for a truck. The engine 1 is designed with a number of cylinders in a conventional manner, whereby a cylinder 2 is shown schematically in the FIGURE. During operation of the engine 1, combustion gases are generated in the combustion chamber 3 of the cylinder 2. The greater part of the combustion gases are led out to the surroundings through an exhaust manifold 4 of the engine 1, and an exhaust conduit 5 connected thereto.

According to the present invention, the engine 1 is arranged with a turbo unit 6 of a previously known type. Turbo unit 6 comprises a gas driven turbine 7 and an air compressor 8. In a known manner, the exhaust gases are fed from the engine 1 through the manifold 4 and the exhaust conduit 5 and further on to the turbine 7. From the turbine 7 the exhaust gases are fed out into the atmosphere, which is indicated with an arrow in the turbine according to the figure.

The turbine 7 is connected to the compressor 8 by means of a common rotating shaft 9. In this manner, the air that streams from the atmosphere to the compressor 8, through an incoming air conduit 10 (which is indicated with an arrow in the FIGURE), may be compressed and fed further on to the engine 1. Preferably, the compressed air that is fed from the compressor 8 is then led further on to an intercooler 11, in which the compressed air is cooled. Then, the cooled air is fed to the air inlet 12 of the engine, by means of a further conduit 13.

Some portion of the combustion gases in each cylinder 2 will be fed past the piston 14 of the cylinder 2 (more exactly between the respective cylinder liner and piston rings of the cylinder 2) and in a direction towards the crankcase 15 of the engine 1. From the crankcase 15, this gas will be transported to an oil pan 16 of the engine 1. When the crankcase gas flows towards the oil present in the oil pan 1, some part of the lubricating oil will be transformed in the form of an aerosol. If this aerosol should be recirculated to the air inlet 12 of the engine 1, it could form coatings on the combustion chamber, valves and similar components of the engine 1, which of course is not desired. For this reason, it is a fundamental principle of the present invention that the exhaust gas is led from the oil pan 16 to an oxidation catalyst 17, through a special conduit 18 that connects from the oil pan 16. In the oxidation catalyst 17, the hydrocarbons which form part of the crankcase gases will be transformed into carbon dioxide and water. After that, the crankcase gases will be fed on to a point along the conduit 10 for incoming air, i.e. a point upstream of the compressor 8, with the aid of a further conduit 19.

It can be noted that since the engine 1 is of the kind that is supplied with a turbo unit 6 and an intercooler 11, the crankcase gases cannot be fed to a point downstream of the compressor 8, since a very high pressure (of the magnitude 100 kPa) prevails there, in relation to what prevails in the oil pan 16. Thus, in such a case, the pressure in the oil pan 16 would be too high. For this reason, the outgoing conduit 19 from the oxidation catalyst 17 must be connected to a point upstream of the compressor 8.

The oxidation catalyst 17 is constructed to have a certain minimum temperature limit at which it is able to operate with a satisfactory cleaning ability. This temperature limit is normally in the magnitude of approximately 200° C. However, it can be noted that a large flow of crankcase gases may have a cooling effect on the oxidation catalyst 17 during operation of the engine 1. The temperature of the oxidation catalyst 17 may then possibly sink to a level below this temperature limit and will consequently no longer be able to operate with an optimal cleaning ability. For this reason, the present invention is preferably arranged so that the oxidation catalyst 17 comprises heating means. According to a preferred embodiment, the oxidation catalyst 17 is more exactly arranged in direct mechanical contact with the exhaust manifold 4 of the engine 1, whereby it can be ensured that the desired temperature of the oxidation catalyst can be reached.

According to an alternative solution of the present invention, the oxidation catalyst 17 may be positioned in direct mechanical contact with the exhaust conduit 5 of the engine 1, to ensure that the desired temperature limit is reached. According to a further alternative embodiment, the oxidation catalyst 17 may be equipped with an electrical heating device, to ensure that the correct operating temperature is achieved.

The invention is not restricted to the embodiment described above, but may be varied within the scope of the appended claims. For example, the invention may be used on different kind of vehicles, e.g. passenger cars, trucks and buses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. Apparatus for the ventilation of crankcase gases in an internal combustion engine including a crankcase, an air inlet, a turbo unit including a compressor, and an exhaust manifold and exhaust conduit, the apparatus comprising a conduit for connecting the crankcase to the air inlet of the engine, and an oxidation catalyst disposed in connection with the conduit for cleaning the crankcase gases, the conduit being connected to the air inlet at a point upstream of the compressor of the turbo unit.

2. The apparatus of claim 1 including heating means for heating the oxidation catalyst.

3. The apparatus of claim 2 wherein the heating means comprises means for mounting the oxidation catalyst proximate to the exhaust manifold of the engine.

4. The apparatus of claim 2 wherein the heating means comprises means for mounting the oxidation catalyst proximate to the exhaust conduit of the engine.

5. The apparatus of claim 2 wherein the heating means comprises an electrical heating device.

6. The apparatus of claim 1 wherein the engine comprises a diesel engine.

* * * * *

UNITED STATES PATENT AND TRADEMARK OFFICE
CERTIFICATE OF CORRECTION

PATENT NO. : 6,196,207 B1
DATED : March 6, 2001
INVENTOR(S) : Lucas Megas

It is certified that error appears in the above-identified patent and that said Letters Patent is hereby corrected as shown below:

(30) Foreign Application Priority Data
"Apr. 17, 1999" should read --Apr. 16, 1999--.

Signed and Sealed this

Fourteenth Day of August, 2001

*Attest:*

NICHOLAS P. GODICI
*Attesting Officer*    *Acting Director of the United States Patent and Trademark Office*